United States Patent [19]

Allard

[11] 4,291,527

[45] Sep. 29, 1981

[54] CABLE STRAND TENSION CONTROLLING APPARATUS

[75] Inventor: Joseph R. Allard, Warwick, R.I.

[73] Assignee: The Entwistle Company, Hudson, Mass.

[21] Appl. No.: 178,289

[22] Filed: Aug. 15, 1980

[51] Int. Cl.[3] .................... D07B 3/00

[52] U.S. Cl. .................... 57/58.84; 57/58.7; 57/294; 57/314

[58] Field of Search .................... 57/3, 58.52, 58.83, 57/58.84, 58.86, 59, 60, 61, 68, 293, 294, 314, 58.7, 6

[56] References Cited

U.S. PATENT DOCUMENTS

| | | | |
|---|---|---|---|
| 2,956,391 | 10/1960 | Dommel et al. | 57/58.52 |
| 3,373,549 | 3/1968 | Shaw | 57/294 |
| 3,385,046 | 5/1968 | Schatz | 57/60 |
| 3,412,544 | 11/1968 | Sugi et al. | 57/314 X |
| 3,475,893 | 11/1969 | Sugi et al. | 57/58.84 |
| 3,481,127 | 12/1969 | Vogelsberg | 57/294 |
| 3,507,108 | 4/1970 | Yoshimura et al. | 57/314 X |
| 3,643,411 | 2/1972 | Vogelsberg | 57/294 |
| 3,782,092 | 1/1974 | Vogelsberg | 57/294 |

*Primary Examiner*—Donald Watkins
*Attorney, Agent, or Firm*—Barlow & Barlow

[57] ABSTRACT

A cable strand tension-controlling apparatus is described. As numerous individual wire or fibre-optic cable strand material is fed from multiple pay-off neutralizers, the cable strand material is directed across a rotating driven capstan and subsequently a rotating idler capstan. The cable strand then is directed into contact with a moveable accumulator. The moveable accumulator is positioned appropriately in response to the internal tension of the cable strand that is in contact with it. Signals eminating from the rotating moveable accumulator are then transmitted to a take-up in order to control the position and movement of the take-up reel.

8 Claims, 3 Drawing Figures

CABLE STRAND TENSION CONTROLLING APPARATUS

BACKGROUND OF THE INVENTION

The present invention relates to cabling systems in general, and more particularly to wire and fibre-optic product cabling systems with cable strand tension-controlling apparatus.

The present invention further relates to an apparatus for controlling the tension of strands that will be wound up on a take-up reel including an apparatus for automatically and accurately maintaining constant the tension in a strand material being handled.

Prior art devices have attempted to control individual cable strand tension and lay speed in many ways. For example, U.S. Pat. No. 2,929,193 by Cook limited pay off speed control by adjusting the speed as the diameter of the coil material on the wind up reel varied accordingly.

U.S. Pat. No. 1,981,083 issued to Sumerville, applied a "planetary" cabling approach to the problem of strand cabling and tension control. Here the "haul off" mechanism was mounted in a cradle which revolved during operation in order to twist the wires into a cable or strand.

Cook in U.S. Pat. No. 2,817,948, provided for an apparatus which allowed for differential speed of rotation of the pay off flyer and the take up reel under relatively light and uniform wire tension throughout the twisting and winding operation. Here however, it was necessary to operate at relatively slow cabling production speeds.

In U.S. Pat. No. 2,338,848, Henning et al dealt with the strand tension control problem by providing a differential gear mechanism receiving power from the flyer driving motor, and also from an induction type torque motor, and delivering the power to drive the take up closer reel. This apparatus also required lower ranges of operating speeds and did not as effectively control the cable strand tension as does the present invention.

SUMMARY OF THE PRESENT INVENTION

An object of the present invention is to control the individual cable strand tension during the cabling process.

A further object of the present invention is to control the tension of individual strands of wire or fibre-optic materials as they are in the process of being wound up on a take up reel mechanism.

Another object of the present invention is to provide an apparatus for automatically and accurately maintaining constant the tension in a strand material being handled.

To accomplish the above stated as well as other objects a cable strand semi-automatically regulated tension controlling apparatus is described. As wire or fibre-optic strand material is fed off multiple pay off neutralizers, the wire or fibre-optic strand is directed around sheaves mounted on a rotating driven capstan, and subsequently rotating idler capstan sheaves. The wire strand is then directed to a moveable accumulator, which is positioned appropriately in response to the internal tension of the wire strand traveling across it. Signals eminating from the rotating moveable accumulator are then transmitted to a signal command and control system in order to control the take-up reel through a dancer potentiometer means.

DESCRIPTION OF THE PREFERRED EMBODIMENT

Figure 1:
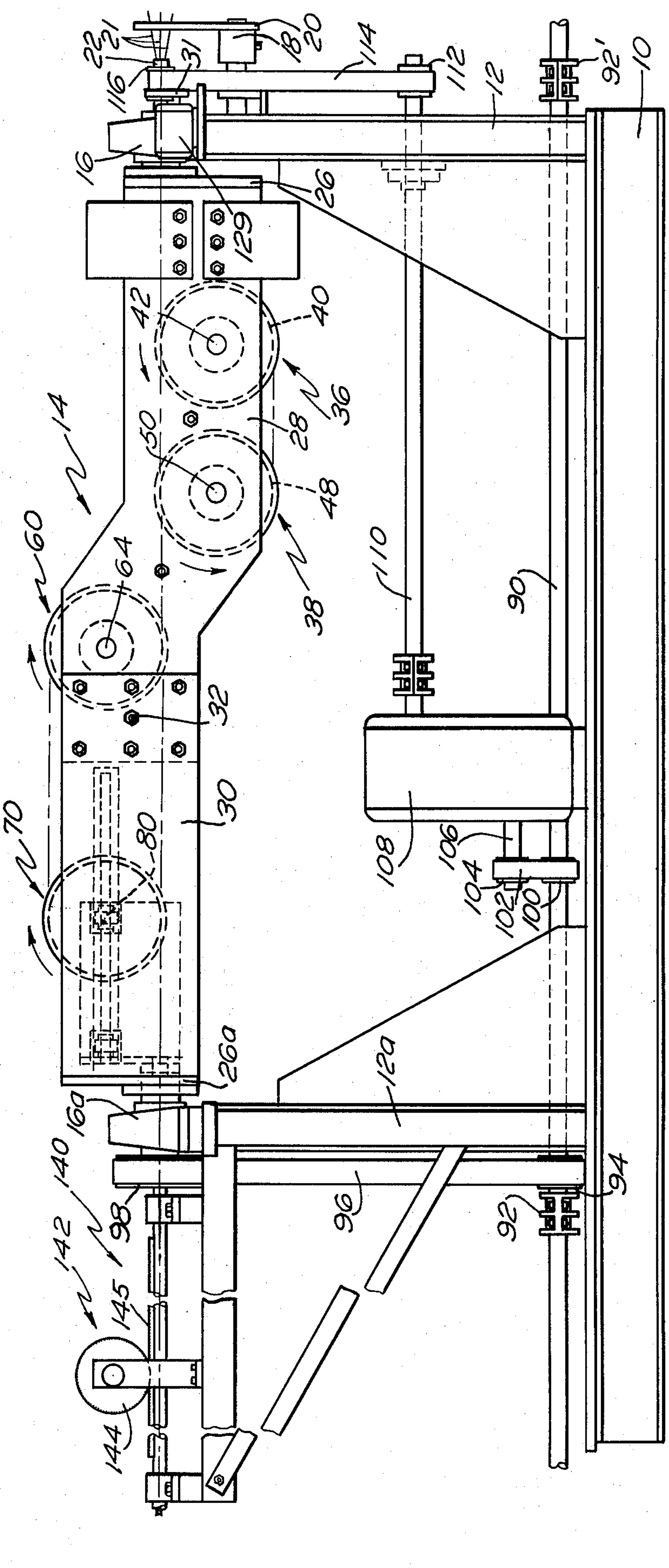
FIG. 1 is a side elevational view of the cable strand tension controlling apparatus of the present invention.

Referring to the drawings wherein the like numerals designate the same or similar elements through the several views, the apparatus described and shown in the drawings is used in cooperation with the individual wire or fibre-optic cable strands after they emerge linearly from a multiple pay-off neutralizer unit (not shown) and a take up mechanism (not shown) and acts to twist the strands of cable between the emergence of the single strands and the take up of the twisted cable.

The apparatus comprises a frame having a base 10 (FIG. 1) and uprights 12 and **12*a* extending upwardly from the base 10. These uprights support the operating mechanism of the apparatus. A frame designated as a whole 14 is mounted in bearings 16, 16*a* at its opposite ends for rotation about a horizontal axis and which frame carries capstans for accomplishing the results intended. At the end having support 12, there is mounted by bracket 18 a layplate 20 having a plurality of holes through which the individual wires or fibre-optic cable strands 21 pass. The strands enter a hollow shaft 22, and by reason of the rotation of frame 14 in its bearing 16, 16*a* that carries capstan 36, the wires are twisted to form a cable. The hollow shaft 22 is supported in bearing 23 on frame 14 and in a tubular shaft 24 that passes through bearing 16. The frame 14 is generally rectangular in shape, having longitudinally extending opposite side bars and cross bars. The longitudinal bars are illustrated as being formed in two sections, there being sections 28, 28*a* at one end and 30 and 30*a* at the other end, which are clamped together by cross bolts 32. The discharge end is supported by a tubular shaft 24*a* in bearing 16*a*, the cable exiting through a hollow shaft 22*a* supported in tubular shaft 24*a*, the shaft 24*a* being fixed to cross bar 26*a***.

Within this frame there is a first capstan 36 and a second capstan 38. Each of these capstans have their peripheral surfaces formed with a plurality of grooves. Those grooves in capstan 36 being designated 40 and being five in number. All of the grooves are fixed one relative to the other and the capstan is fixed on its shaft 42 to rotate therewith. A balance weight 44 is also mounted on shaft 42 and this shaft has bearings in the longitudinal extendings rails at 46 and **46*a***.

Similar capstan 38 has grooves 48, each extending circularly substantially parallel with each other. The grooves in the periphery of the capstan 38 rotate in unison with the grooves in capstan 36, the latter being keyed to the shaft 50 that is mounted in bearings 52 and **52*a* in the longitudinal extending members 25, 25*a* of the frame 14. This capstan 38 also has a mounted balance weight 54 attached to its shaft 50. The twisted wire cable starts in as it is fed and lodges in grooves 40′ having a tangential relationship therewith then extends to groove 48′ in capstan 38 having a tangential relation therewith and passes around this capstan 38 in that groove and then extends on the other side of the capstan to groove 40″ in capstan 36 continuing in that groove through substantially 180° where it passes to groove 48″ in capstan 38** and so on until it passes about the desired number of grooves to obtain drive action for the cable in the machine.

In the frame 14 is an accumulator sheave designated generally 60 that differs from the capstans heretofore described. This sheave 60 has a plurality of individual pulleys 62 loosely mounted upon a shaft 64 to freely rotate about the shaft and each of these pulleys may also rotate individually and separately from each other. The pulleys are all grooved as at 66 with substantially the same type of groove as in the capstans heretofore described. Shaft 64 is mounted in bearings 68 and 68*a* in the longitudinal extending members of the frame 14.

Figure 2:
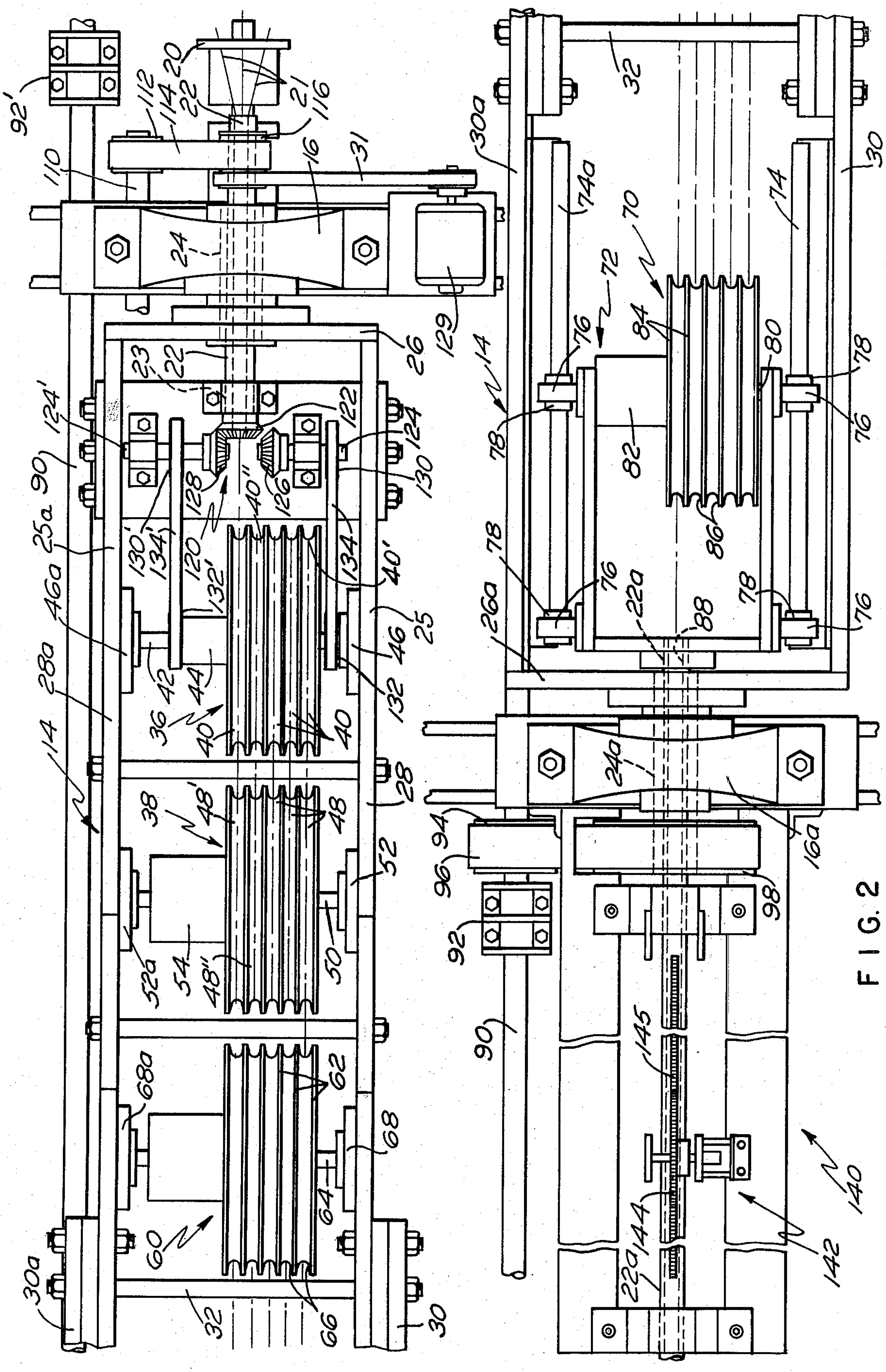
FIG. 2 is a top plan view of the cable strand tension controlling apparatus of the present invention.

The companion accumulator pulley is designated generally 70 (FIGS. 2 and 3) and is located in the wider section of the frame 14 being shown at the lower portion of the drawing sheet of FIG. 2. A carriage designated generally 72 is slidably mounted on rods 74 and 74*a* by means of bearing brackets 76 thereon. Each of these brackets carries a shaft bearing 78 which mounts shafts 74 and 74*a* upon which the accumulator pulley generally designated 70 is freely mounted to slide. This accumulator pulley 70 has a balance means 82 and is provided, as is accumulator sheave 60, with a plurality of pulleys 84 each independent of the other and freely rotatable upon shaft 80. Each of these pulleys is grooved as at 86 as are the grooves in accumulator sheave 60.

As the cable leaves capstan 38 in the last groove thereof it is led to the groove 66 of the accumulator sheave 60 where it has tangential contact and then to an alligned groove 86 in the accumulator pulley 70. It is looped about the accumulator sheave and pulley 60 and 70 in a manner similar to the looping of the cable about the capstans 36 and 38 and then emerges from the last pulley 70 substantially on the axis of frame 14 and out of the horizontally revolving frame through opening 88 in hollow shaft 22*a* (FIG. 2) and to the cable take-up mechanism.

From the cable take-up mechanism there extends a drive shaft 90 which runs substantially the length of the apparatus being coupled together at various points such as 92, 92′. A pulley 94 (FIG. 1) is on drive shaft 90 and belt 96 from that pulley drives pulley 98 on the shaft 22*a* (FIG. 2) at one end of the frame 14 to thus rotate the frame from and in time with the take-up mechanism. The ratio is usually one turn of the shaft 90 to one turn of the frame 14.

From another point on the shaft 90 there is a pulley 100 (FIG. 1) which through belt 102 drives pulley 104 on the shaft 106 of a speed varying mechanism 108 located in a suitable housing. From the speed variable mechanism there extends a shaft 110 which has its far end suitably supported from upright 12 and on which is mounted a pulley 112 engageable by a belt 114 to drive pulley 116 on shaft 22 which extends through the cross bar 26 of the frame 14 and in to a gear mechanism 120 which consists of a bevel gear on the end of shaft 22 designated 122 and beyond the end of which there extends at right angles shafts 124 and 124′ having mounted thereon at either side of the bevel gear 122 bevel gears 126 and 128, the purpose of which is to drive the capstans in either direction depending upon which of these gears 126 or 128 is in mesh with the bevel gear 122. On the shafts 124 and 124′ there are pulleys 130 and 130′ which drive pulleys 132 and 132′ on shaft 42 by means of belt 134 and 134′. Thus, there is a selective drive of the capstans in either direction by reason of the pair of bevel gears on shafts 124 and 124′ at either side of the bevel gear 122.

The capstans 36 and 38 thus pull and meter the twisted wire or cable into the horizontally rotating frame 14 while the take-up mechanism pulls the wire after passing about the capstan and accumulators from the machine. As the cable passes from the frame 14 rotating about a horizontal axis it extends across the area designated generally 140 where there is located an accumulator position potentiometer 142 having a gear 144 which rides upon the top of a rack 145 that is coupled to movable accumulator carriage 72 by being fixed to reciprocating shaft 22*a*. The potentiometer arm moves as the position of the accumulator varies, for example, the resistance slackens and the accumulator sheaves and pulleys 60 and 70 move apart and rises as the cable tensions, in which case the sheaves and pulley move together. As the tension increases or lowers beyond desired limits, the potentiometer will cause actuation of the speed mechanism of the take-up to increase or decrease so as to maintain the tension on the cable within limits at all times. Thus between the twist of the wires of the cable formation and the take-up of the cable, a tension control is provided largely because of the accumulator mechanism in which as the tension decreases the accumulator pulley 70 is moved away from the accumulator sheave 60 or as the tension increases the accumulator pulley 70 moves closer toward the accumulator sheave 60 by reason of the slide carriage designated generally 72 above described.

Figure 3:
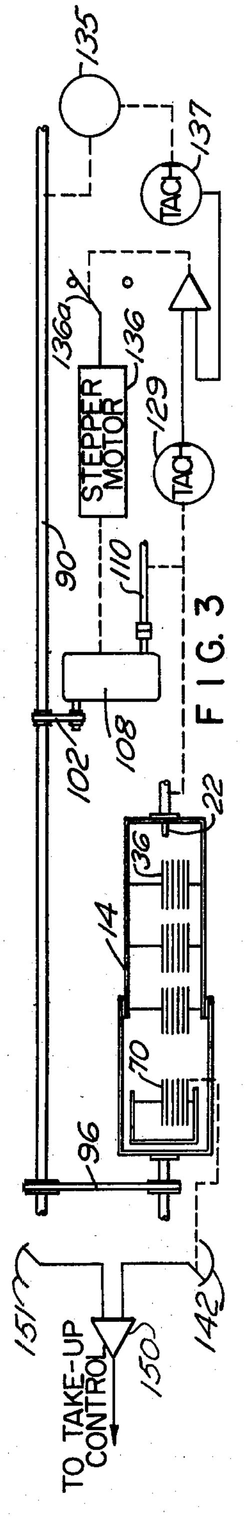
FIG. 3 is a simplified single line electrical diagram of the control mechanism of the cable strand tension controlling apparatus of the present invention.

Referring now to FIG. 3 of the drawings, there is shown in a simplified electrical and mechanical line diagram the control mechanism used in conjunction with the present invention.

There is illustrated a DC motor 135 that is mechanically coupled to the line or drive shaft 90. The shaft 90 is in turn coupled via a belt 96 to rotate the frame 14. Additionally, the line shaft is coupled over a belt 102 to the speed variator 108. The output of the speed variator 108 on shaft 110 is coupled to the capstan 36 and the speed of shaft 110 is monitored by having the same coupled to a tachometer generator 129 which in effect monitors the line speed of the wire or cable. The position of the accumulator 70 is coupled to the position potentiometer 142 and the electrical position of this potentiometer is then sent on through suitable electronic controls to vary the speed of the take-up reel on which the cable product is to be wound. In effect, the position of the accumulator sheave 70 will control the tension of the cable line and as can be seen effectively tells the take-up reel to either speed up or slow down so that the tension will be maintained constantly. One of the simplest ways of doing this from an electrical standpoint is to utilize a differential amplifier such as 150 and a position potentiometer 151 which will in effect adjust a certain tension or position of the accumulator sheave and when the electrical inputs become unbalanced, then a signal is sent out of the amplifier 150 which will activate suitable controls on the take-up reel control to either speed up or slow down the take-up reel. Tension on the cable product is initially insured by a torque motor or pneumatic means connected to the accumulator 70 (not shown).

It will of course be appreciated that the lay of the cable can be controlled by varying the ratio of the speed of the capstan 36 to the speed of rotation of the frame 14 and thus the output of the speed variation device 108 may be changed to change the actual lay of the cable. To accomplish this, a stepper 136 is provided to change the ratio of the speed variation device 108. The operation of the stepper is controlled by a switch 136a for increase or decrease, the switch being under the control of tachometer generators 129 and 137 that monitor respectively the speed of the main drive 90 and the revolution of frame 14, as well as the line speed as seen on capstan 36.

What is claimed is:

1. A cable strand apparatus in a wire strand cabling system, comprising in combination:
- a pair of axially spaced capstan means about both of which the entering strand is trained;
- an accumulator means about which the cable is trained after leaving the capstan means;
- a housing rotatably mounting said pair of capstan means and said accumulator means; and
- a means for rotating said housing.

2. A cable strand tension controlling apparatus in a wire strand cabling system, comprising in combination:
- a driven capstan;
- an idler capstan;
- an accumulator sheave means;
- a moveble accumulator pulley means;
- a housing for rotatably mounting said capstans and accumulator means components;
- a means for rotating said housing; and
- a cable strand tension control means responsive to said moveable accumulator pulley.

3. A cable strand tension controlling apparatus as defined in claim 2 wherein the capstan means further comprises:
- a means for uniformly and precisely controlling the drive of said capstan.

4. A cable strand apparatus as defined in claim 1, wherein the accumulator means comprises:
- an accumulator sheave;
- a moveable accumulator pulley;
- said moveable accumulator pulley fully responsive to cable strand tension;
- a moveable accumulator position signalling means coupled to said moveable pulley.

5. A cable strand apparatus as defined in claim 1 wherein the said housing further comprises:
- a drive means;
- a hollow shaft at each end of said housing serving as an axle means;
- a means connecting said drive means with said axle means.

6. A cable strand apparatus as defined in claim 5 including a cable strand lay plate mounted adjacent said hollow shaft at the strand entering end.

7. A cable strand apparatus as defined in claim 2 wherein the driven and idler capstans are laterally offset in the housing in two planes whereby the entering and leaving cable tangentially contacts the periphery of the capstans on the rotating axis of the housing.

8. A cable strand apparatus as defined in claim 1 wherein the driven and idler capstans are laterally offset in the housing in two planes whereby the entering and leaving cable tangentially contacts the periphery of the capstans on the rotating axis of the housing.

* * * * *